Oct. 17, 1950  D. N. JUDELSON  2,526,029
MACHINE FOR CUTTING MATERIALS INTO STRIPS
Filed April 2, 1948  6 Sheets-Sheet 6
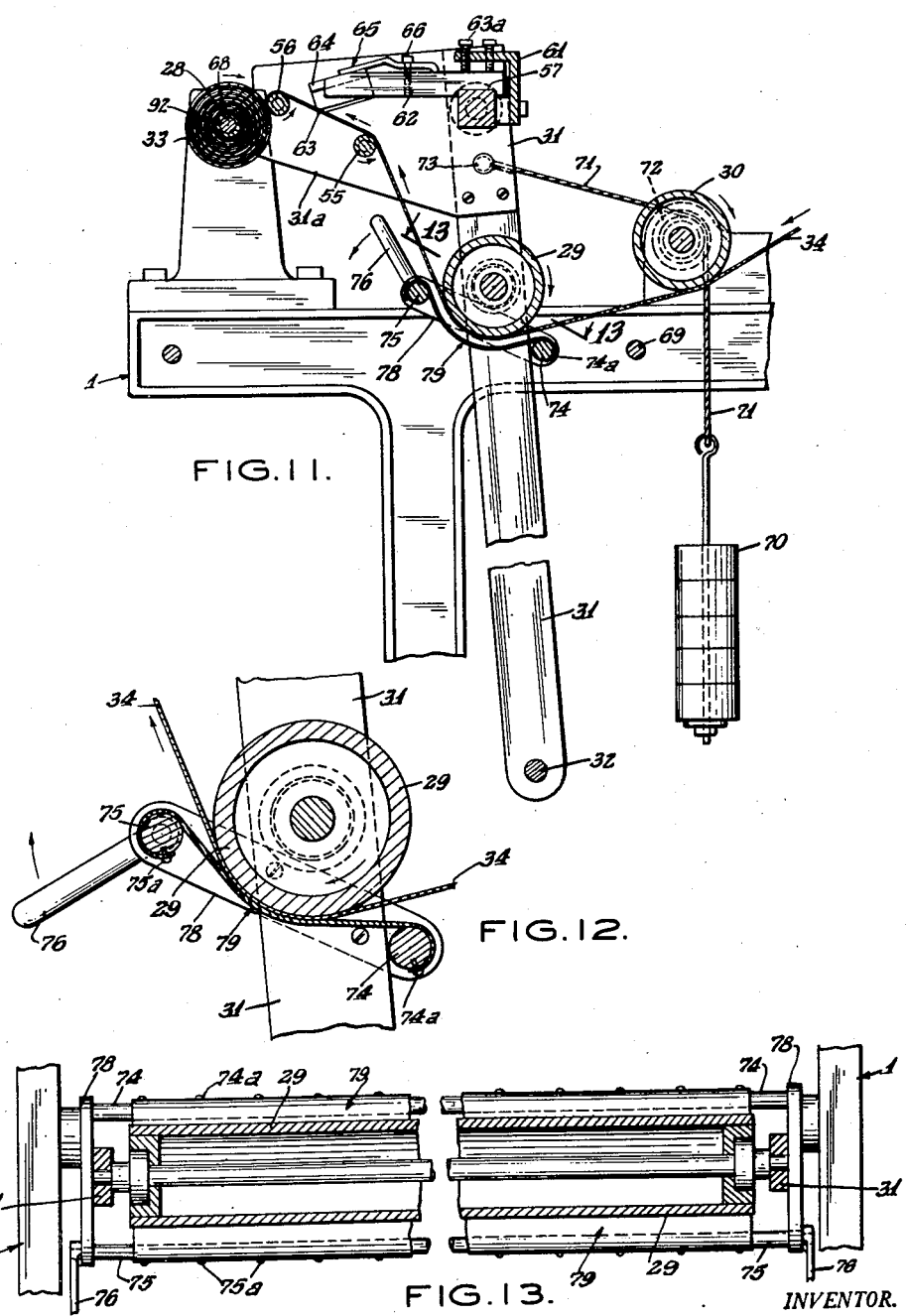
INVENTOR.
DAVID N. JUDELSON
BY Mock & Blum
ATTORNEYS Patented Oct. 17, 1950

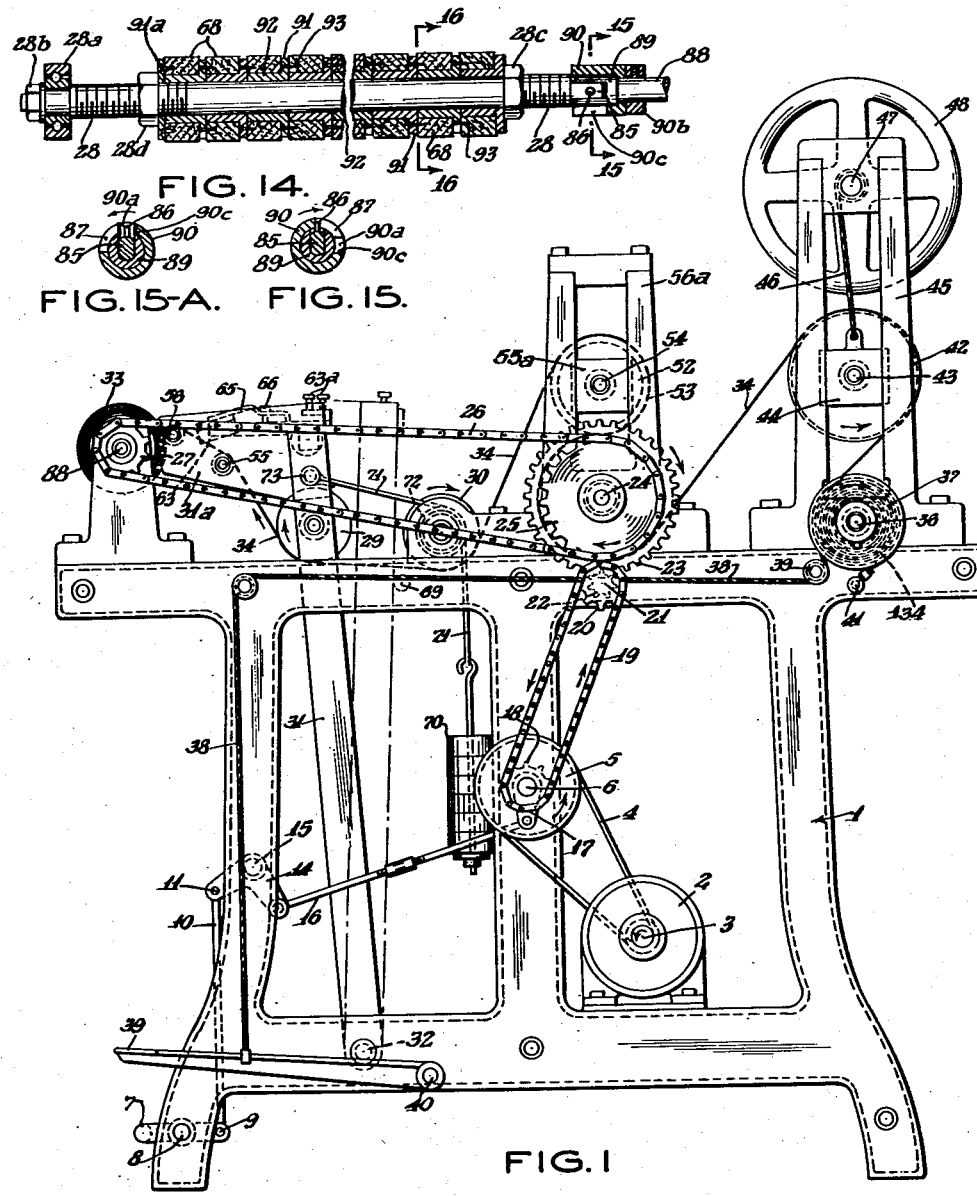
Oct. 17, 1950     D. N. JUDELSON     2,526,029
MACHINE FOR CUTTING MATERIALS INTO STRIPS
Filed April 2, 1948     6 Sheets-Sheet 1
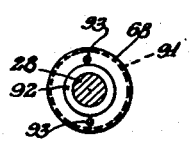
FIG.16.
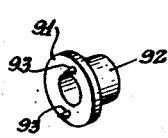
FIG.17.
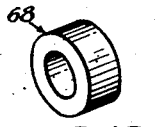
FIG.18.
INVENTOR.
DAVID N. JUDELSON
BY Mock & Blum
ATTORNEYS

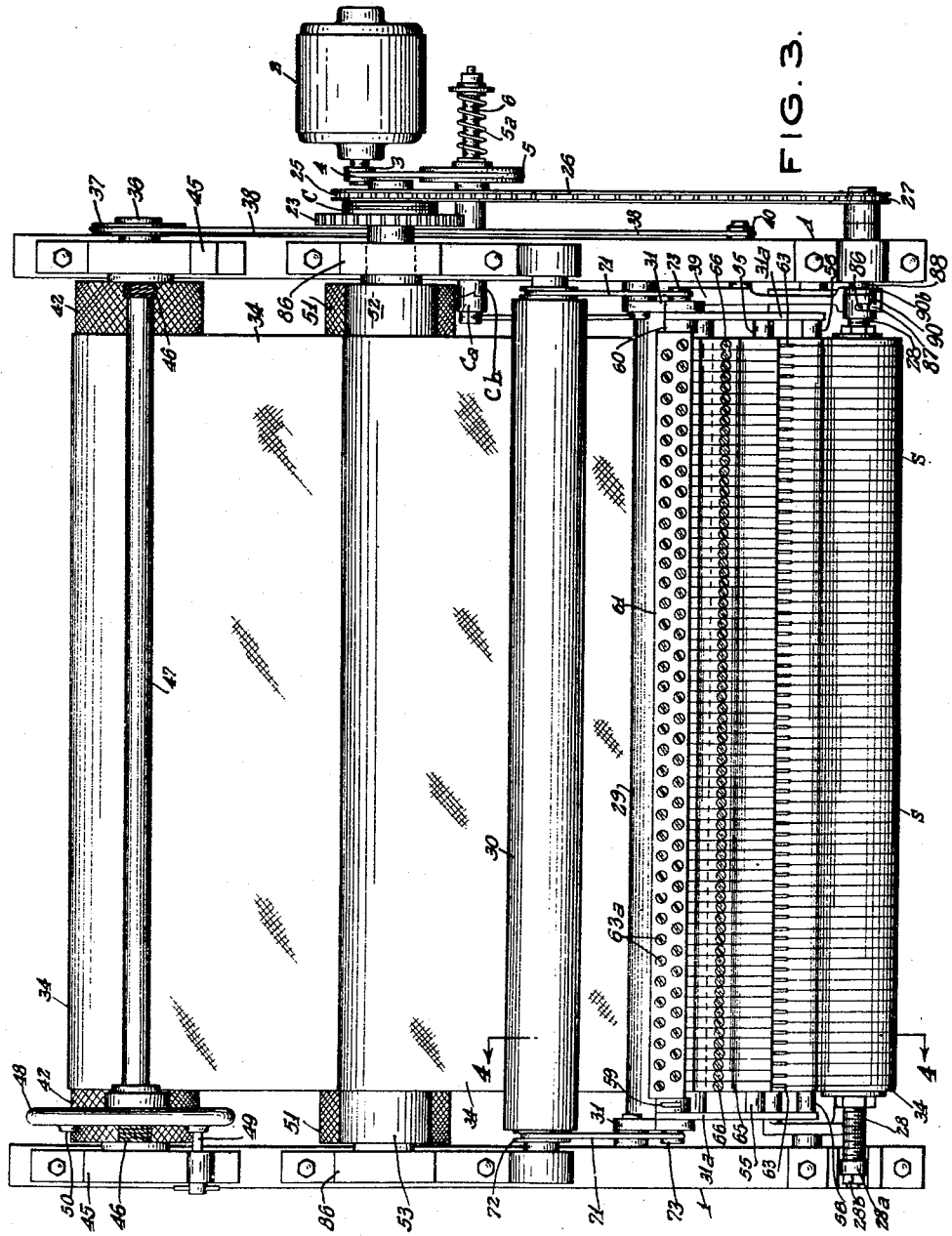

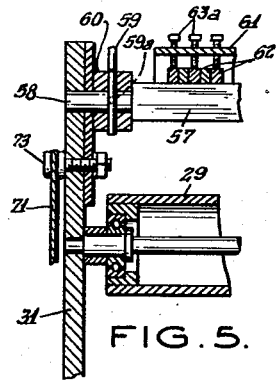

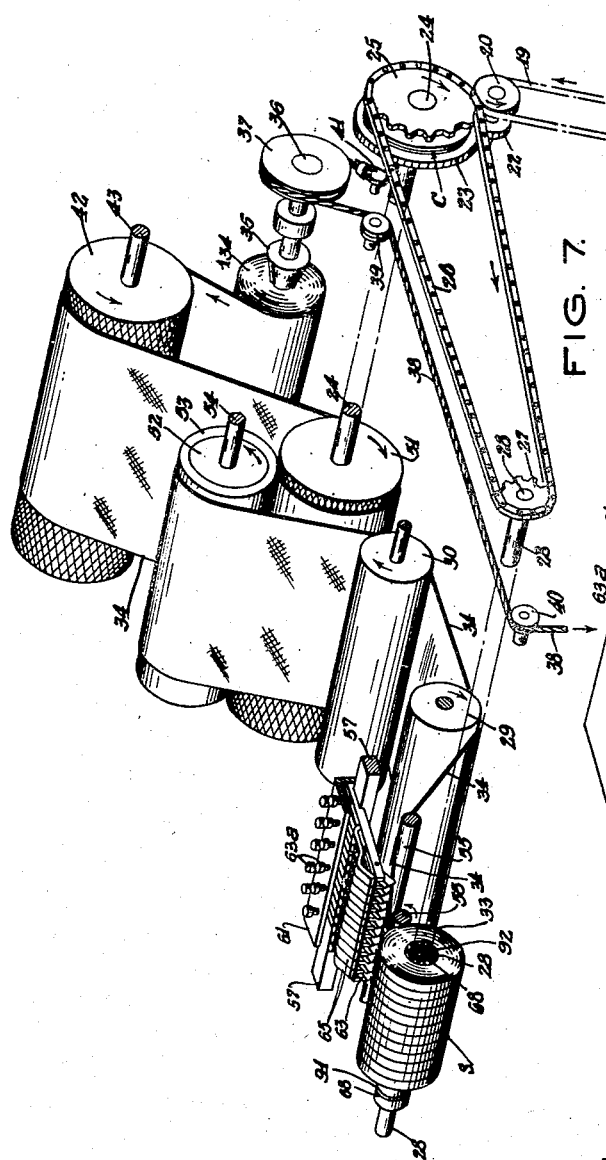

2,526,029

UNITED STATES PATENT OFFICE 2,526,029

MACHINE FOR CUTTING MATERIALS INTO STRIPS

David N. Judelson, Parkridge, N. J.

Application April 2, 1948, Serial No. 18,613

2 Claims. (Cl. 164—65)

My invention relates to a new and improved method of and a new and improved machine for cutting materials into strips.

While the invention relates to the cutting of all types of material into strips, it relates particularly to the cutting of sheets or webs of various plastics into strip form. The designation "plastic" is a general one, and it includes all the materials specified in "Handbook of Plastics," by Simonds and Ellis, published in 1943 by D. Van Nostrand & Company, Inc. Said designation "plastics" therefore includes the material designated in said text as "Cellophane" and it includes various resins.

Heretofore, in cutting such material, as exemplified by "Cellophane," into strip form, it has been very difficult to secure strips of even width.

Thus, in cutting "Cellophane," the practice has been to unwind a web of this material from a roll, and to slit the "Cellophane" web by means of shears or cutters of the shear type. In using this type of cutter, it is very difficult, if not impossible, to make the strips of identical width.

In cutting many plastics of the resin type, it has been found that such plastics are deformed and softened and even fused under the action of moderate heat. When a spiral roll of such material is cut into strips by means of circular rotating cutters, the friction developed by the circular rotating cutters develops enough heat to fuse the edges of the strips to each other. Under such circumstances, it is necessary to cool the resin material which was being cut by applying water or oil or other cooling agent.

According to my invention, I can easily and accurately cut these materials, such as "Cellophane" and other plastics, quickly and accurately into even strip form, of uniform width, without the use of cooling agents.

According to my invention, I feed a web of the material longitudinally towards a single take-up shaft, on which the strips of material which are cut from said web are wound in respective spiral rolls. The web may have one or more bends therein, but its feed is generally in the direction of its longitudinal axis. Anterior said take-up shaft, I provide a cutting zone on which the uncut web is fed upwardly and longitudinally forwardly and in substantially planar form under suitable tension. This tension may be of any selected value. I contact the web in said cutting zone with a series of slitting or cutting blades, such as thin razor blades, which are inclined downwardly. These cutting blades are held fixed relative to the web, save when said blades are shifted, as later described, thus eliminating objectionable heating of the web. Hence, when I refer to slitting blades or slitting surfaces, I refer to blades or surfaces which are held fixed relative to the moving web, save for said shift. I subject the spiral wound-up rolls of the strips to forward pressure at the rears of the peripheries of said rolls. I decrease said pressure as the diameter of said rolls increases.

I always form the slits in the web, at the same longitudinal distance from the peripheries of said rolls. That is, as the diameter of said rolls increases, I shift the cutting blades rearwardly relative to the take-up shaft.

The longitudinal tension to which the web is subjected in the cutting zone and forwardly of said zone, is preferably insufficient to impart any permanent stretch to the material. Said tension may be close to the stretch point of the material at which it is permanently stretched. If desired, I can impart a permanent stretch to the material in the cutting zone and forwardly thereof.

Another important feature of my invention is to provide a plurality of guide-rolls which are longitudinally movable to-and-fro, and which are located rearwardly of the front take-up shaft. Said guide-rolls are preferably connected to a frame which is movable relative to the take-up shaft. Said frame is forwardly longitudinally biased so that the front frame roll is always pressed forwardly against the rears of the peripheries of the rolls of the wound-up strips on the take-up shaft. The slits are preferably formed as close as possible to the rear of said front frame roll, thus ensuring accurate slitting into strips of uniform width. The slitting blades are also preferably connected to the frame, so that the slitting blades always contact with and perforate and slit the web at the same longitudinal distance rearwardly of said front frame roll.

Further objects and features of my invention are stated in the annexed description and drawings which illustrate preferred embodiments thereof.

Fig. 1 is a side elevation of the improved machine;

Fig. 3 is a top plan view of the improved machine;

Fig. 4 is a section on the line 4—4 of Fig. 3.

Figure 2:
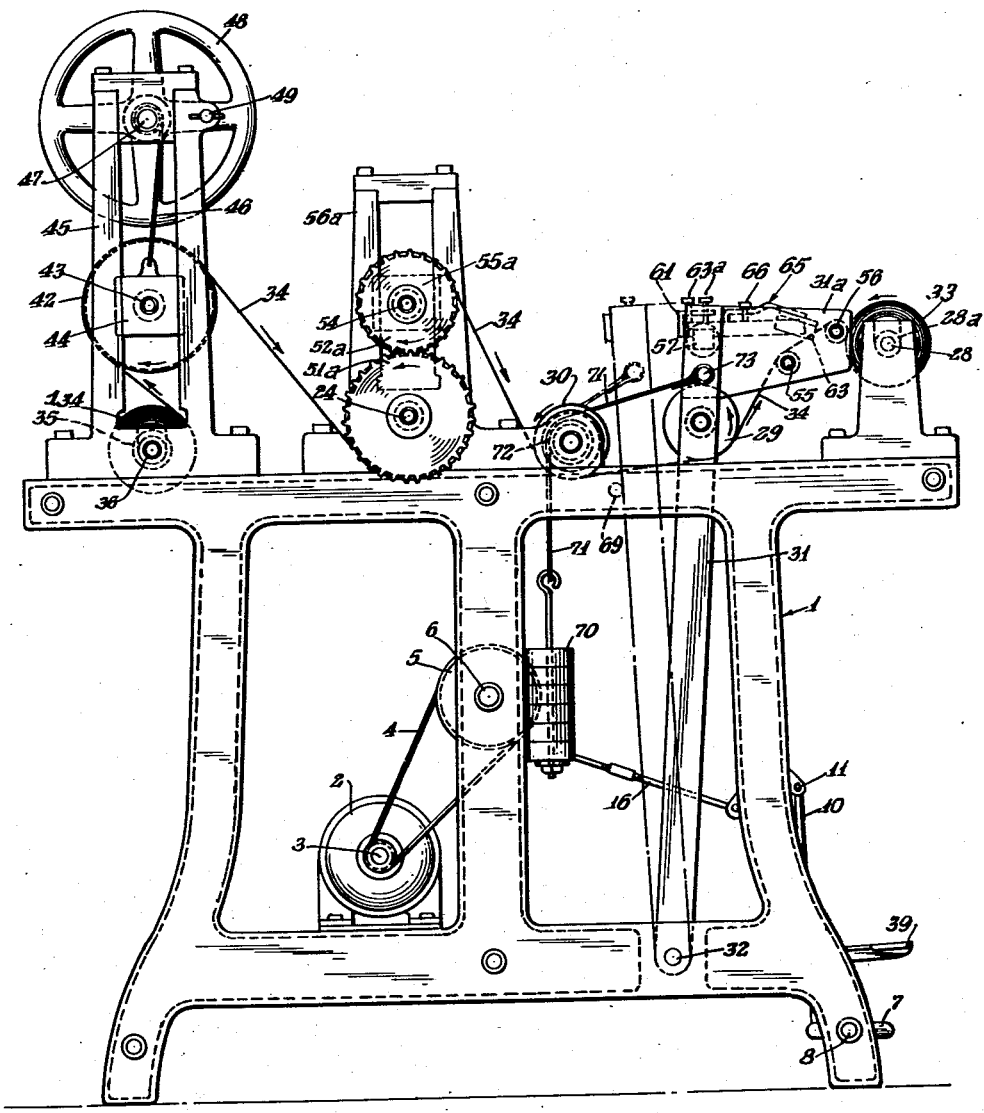
Fig. 2 is a side elevation at the other side of the machine.

This illustrates the cutting blades and certain adjacent parts. The cutting blades are shown in operating or cutting position;

Fig. 5 is a section on the line 5—5 of Fig. 4, also showing the cutting blades in operative or cutting position;

Fig. 6 is similar to Fig. 4, showing the cutting blades in non-cutting or non-operating position. The blade mount is turned to this position of Fig. 6, when a new web of material is threaded through the machine, or when it is desired to replace worn cutting blades;

Fig. 7 is an illustrative perspective view of certain important parts of the machine, showing the cutting blades in cutting position;

Fig. 8 is an enlarged perspective view of the cutting blades and the means for holding the cutting blades;

Fig. 9 is a section on the line 9—9 of Fig. 8;

Fig. 10 is a section on the line 10—10 of Fig. 9;

Fig. 11 is similar to Fig. 4, showing a braking device which is a modification of that shown in Fig. 4. In Fig. 11, the respective braking device is shown in loose or non-operating position;

Fig. 12 is an enlarged detail view of Fig. 11, showing the braking device of Fig. 11 in operating position;

Fig. 13 is a section on the line 13—13 of Fig. 11;

Fig. 14 is a sectional view, partially in elevation, which shows the take-up shaft at the front end of the machine, the mandrel sleeves on which the respective cut strips are respectively wound in respective rolls, and the assembly means for providing a releasable assembly between said mandrel sleeves and the take-up shaft. The take-up shaft is shown as connected to its shaft-extension;

Fig. 15 is a section on the line 15—15 of Fig. 14, showing a control collar in operative position for connecting the take-up shaft to its shaft-extension;

Fig. 15A is similar to Fig. 15, showing said control collar in non-operating position, in which the take-up shaft can be released from its shaft extension and removed from the machine;

Fig. 16 is a section on the line 16—16 of Fig. 14;

Fig. 17 is a perspective view of one of the rigid metal bushings which are part of the assembly shown in Fig. 14; and Fig. 18 is a perspective view of one of the mandrel sleeves.

As shown in Fig. 1, the motor 2 is fixed to frame 1 of the machine. The lateral shaft of motor 2 has a pulley 3, which is connected by belt 4 to pulley 5, which is mounted on lateral shaft 6. Any conventional clutch or coupling mechanism can be provided for coupling pulley 5 to shaft 6 and for uncoupling pulley 5 from shaft 6.

One conventional type of such coupling mechanism is illustrated in the drawings. As shown in Fig. 3, shaft 6 has a toothed coupling-head Ca. Pulley 5 has a hub which has a corresponding coupling-end Cb. The hub of pulley 5 is slidable on shaft 6. A compression spring 5a normally holds the coupling members Ca and Cb in the operating or coupled position of Fig. 3.

Fig. 1 shows a foot-pedal 7, pivotally connected by pivot pin 8 to frame 1. This foot-pedal 7 is pivotally connected by pivot pin 9 to link 10, which is pivotally connected by pivot pin 11 to bell-crank lever 14, pivoted by pivot pin 15 to frame 1. Said bell-crank lever 14 is pivotally connected to an adjustable link 16, which is pivotally connected to an arm 17, which is mounted turnably and freely on shaft 6. Arm 17 has the usual cam head, not shown, so that when foot-pedal 7 is depressed, arm 17 slides the hub of pulley 5 to the uncoupling position. This type of coupling may be omitted and pulley 5 may be releasably in any manner fixed to shaft 6. Also, I can use the well-known type of coupling which remains normally non-operative, and which is moved into operative position by depressing a foot-pedal.

As shown in Fig. 1, a sprocket 18 is fixed to shaft 6. Sprocket 18 is connected by chain 19 to sprocket 20, fixed to shaft 21, which has a pinion 22 fixed thereto. Pinion or gear 22 meshes with gear 23 fixed to shaft 24, thus driving shaft 24 when shaft 6 is driven. Sprocket 25 which is coupled to gear 23 by a slip friction-clutch C, is connected by chain 26 to sprocket 27, which is fixed to the shaft-extension 88 of the take-up shaft 28, which is located at the front of the machine.

As shown in Fig. 14, shaft-extension 88 has a head or enlargement 89, thus providing a shoulder at the junction between shaft-extension 88 and its head 89.

A control collar 90 is turnable on shaft-extension 88 and its head 89. Said control collar 90 has an internal shoulder which abuts the external junction shoulder of shaft-extension 88 and its head 89. Collar 90 is held against slipping out of position by an end-collar 90b, which is releasably fixed to shaft-extension 88.

As shown in Figs. 14, 15A and 15, head 89 has a rectangular recess which is parallel to the common axis of shaft 28 and its shaft extension 88. Shaft 28 has a reduced shaft-end 85, which fits in said rectangular recess of head 89, so that shaft 28 and its shaft-extension 88 can be rotated in unison. A pin 86 is fixed to shaft-end 85.

The control collar 90 has a slot 90a which has walls 90c which are parallel to the common axis of shaft 28 and its shaft-extension 88. Said control collar 90 also has a slot 87, which is circumferential and which intersects slot 90a between the ends of slot 90a. When control collar 90 is turned to its release position of Fig. 15A, the pin 86 is out of circumferential slot 87 and said pin 86 is located in slot 90a. The shaft-end 85 can then be separated from the recess of head 89. When control collar 90 is in its position of Fig. 15, the pin 86 is out of slot 90a and in slot 87, thus locking shaft-end 85 to head 89.

Instead of using a single take-up mandrel on the take-up shaft 28 for winding the cut strips S, I optionally and preferably use a series of separate mandrel sleeves 68, which may be tubes of paper, cardboard or the like. Each mandrel sleeve 68 is mounted on the hollow cylindrical shank of a metal bushing 92, which has a head 91 which is provided with axial piercing pins 93.

When the bushings 92 and their mandrel sleeves 68 are assembled as shown in Fig. 14, each mandrel sleeve 68 is located and clamped between two respective bushing-heads 91, and each mandrel sleeve 68 is engaged by the piercing pins 93 of a respective bushing head 91. The outer walls of mandrel sleeves 68 are flush with the edge-walls of the bushing-heads 91, or said outer walls of mandrel sleeves 68 are of slightly greater diameter than said edge-walls. Said outer walls of mandrel sleeves 68 are parts of a cylinder of uniform diameter.

A part of shaft 28 has an external thread

The right bushing head 91 of Fig. 14 abuts a nut 28c, whose internal thread engages the external thread of shaft 28. Nut 28c is turnable on shaft 28 to a selected adjusted position. Nut 28c then rotates in unison with shaft 28.

A collar 91a, which also has piercing pins 93, is mounted on shaft 28 at the left of the assembly of Fig. 14. The pins 93 of collar 91a enter the respective adjacent mandrel sleeve 68. A nut 28d is turnable on shaft 28 to releasably clamp the entire assembly between nuts 28d and 28c. This nut 28d rotates in unison with shaft 28.

The shaft 28 has a reduced bearing end, which is in the internal race of an anti-friction bearing 28a, whose outer race is fixed detachably to frame 1. An end clamp-nut 28b, which is mounted on an externally threaded section of shaft 28, provides a releasable clamp assembly between shaft 28 and its single bearing 28a. An external clamping shoulder is provided at the junction between shaft 28 and its reduced bearing end which is located in the internal race of bearing 28a.

The shaft-extension 88 has its own bearing in the frame 1.

After the respective cut strips S have been wound in spiral rolls 33 of the same outer diameter upon the respective mandrel sleeves 68, the rotation of shaft 28 is stopped. The control collar 90 is then turned from its locking position of Fig. 15 to its release position of Fig. 15A.

The bearing 28a is then released from frame 1. Said bearing 28a is located in a vertical recess of frame 1. Hence, when the shaft-end 85 of shaft 28 is released from the enlargement or head 89, the entire shaft 28 and its bearing 28a and the parts assembled on shaft 28 can be removed as a sub-unit from the machine.

The clamping nut 28c can then be screwed off the shaft 28, and the bushings 92 and mandrel sleeve 68 with their wound-up strips S can be easily slipped off the take-up shaft 28. The mandrel sleeves 68 and their respective spiral rolls can then be easily slipped off the shanks of the bushings 92. An additional assembly can then be made with new mandrel sleeves 68, and the shaft 28 and its assembled bushings 92 and mandrel sleeves 68 and clamping nuts 28d and 28c and bearing 28a are replaced in the machine.

As shown in Fig. 7, the material 34 is wound spirally on a suitable hollow mandrel to provide a magazine roll 134. Said mandrel is engaged releasably by the frusto-conical heads 35 of respective idler shafts 36, which are mounted turnably and releasably in frame 1. One of said shafts 36 is provided with a brake-drum 37, which has a brake-cable 38. This brake-cable 38 is normally loose. If the roll 134 has air-pockets or if the web of the material 34 is not uniform, the brake-cable 38 may be temporarily tightened, in order to subject material 34 to tension or to increased tension adjacent magazine roll 134.

One end of brake-cable 38 is fixed to a stud 41, which is fixed to frame 1.

The other end of brake-cable 38 is fixed to brake-pedal 39, which is pivotally connected by pivot pin 40 to frame 1. Idler guide rolls 40 and 39, which are turnably mounted in frame 1, are provided for the brake-cable 38.

The web of the material 34 is led rearwardly and upwardly from magazine roll 134 to contact with a part of a vertically adjustable knurled idler roll 42, which is made of metal or other rigid material. Said idler roll 42 has a shaft 43, which is mounted in vertically slidable bearings 44, which are slidable between vertical guides 45 of the frame 1.

One end of a lifting cable 46 is fixed to a respective bearing 44. The other end of cable 46 is fixed to a winding shaft 47, to which a handwheel 48 is fixed. Said hand-wheel 48 has a series of hollow bosses 50. A laterally slidable latch pin 49 is slidable in a lug of one of the guides 45. This latch pin 49 can be engaged with a selected boss 50, to hold the winding shaft 47 after idler roll 42 has been raised to its selected vertical position by turning the hand wheel 48.

From the idler roll 42, the material 34 moves forwardly and under a rigid, knurled metal roll 51, and around a part of said roll 51, and then rearwardly and upwardly and around the sleeve 53 of a rigid, metal pressure roll 52, and then downwardly and forwardly and around a part of idler roll 30. The rigid knurled roll 51 is fixed to shaft 24, which is driven by gears 23 and 22 when shaft 6 is driven. The pressure roll 52 has a sleeve 53 which is made of resilient and compressible material, such as vulcanized rubber. The pressure roll 52 is rotated frictionally by roll 51, so that rolls 51 and 52 operate as feed rolls. The pressure roll 52 is fixed to a shaft 54, which is mounted turnably in bearings 55a which are vertically slidable between guides 56a which are fixed to frame 1. The weight of roll 52 and its bearings 55a provides the pressure of roll 52. This pressure of roll 52 is sufficient frictionally to grip the web 34 between rolls 52 and 51, so that the web 34 does not slip between rolls 52 and 51.

The idler roll 30 is mounted turnably in extensions of frame 1.

From the idler roll 30, the web 34 moves under and in contact with idler roll 29, and then over and in contact with the succeeding idler rolls 55 and 56.

The idler roll 29 is mounted turnably in the legs of a frame 31. Said frame 31 is of inverted V-shape, and it has an upstanding leg at each side of the machine. Said long legs are fixed to a lateral shaft 32 which is turnably mounted in frame 1. In effect, the top of said frame 31 is substantially longitudinally movable in a horizontal plane. That is, due to the length of the legs of frame 31, the support of blades 63 is shifted in an arc of small curvature. Said frame 31 has forward extension plates 31a, in which the idler rolls 55 and 56 are turnably mounted. The cutting blades 63 are located between the idler rolls 55 and 56, to perforate and cut the material 34 into strips S which are wound to form respective spiral rolls 33 on the respective mandrel sleeves 68.

The cutting blades 63 are connected to said pivoted frame 31. These blades 63 may be thin razor blades, which are sufficiently rigid so that they will not bend during the cutting.

Fig. 8 shows a blade mount, which is illustrated as a square bar 57. As shown in Fig. 5, this bar 57 has cylindrical extensions 58, which are turnably mounted in bores of hubs 60 which are fixed to the upstanding legs of frame 31.

Fig. 6 shows the bar 57 and frame 31 in positions in which worn cutting blades 63 can be removed and replaced, and in, which the material 34 can be initially threaded through the machine.

Fig. 5 shows a locking pin 59 which is slidable through a bore of the respective hub 60. In the position of bar 57 which is shown in Fig. 4 and Fig. 5, said locking pin 59 extends through a bore 59a of the respective extension 58, thus holding the bar 57 and its cutter blades in the operating position of Figs. 1, 4, 5 and other figures.

Fig. 6 shows that said cylindrical extension 58 has another bore, which is perpendicular to bore 59a. In the position of square bar 57 which is shown in Fig. 6, the locking pin 59 extends through said other bore. The invention is not limited to the square cross-sectional shape of bar 57.

Fig. 8 shows an angle bar 61 which is fixed to bar 57. A series of blade bars 62 are detachably fixed to the bar 57. Each blade bar 62 has a recess into which the holder bar 57 extends. These blade bars 62 may be very narrow, to permit the cutting of narrow strips. The inner end of each blade bar 62 abuts the base leg of angle bar 62, which is shown in the vertical position in Fig. 8.

Each blade bar 62 is fixed detachably to holder bar 57 by a respective clamping screw 63a, whose shank extends through a respective tapped bore of the free leg of angle bar 61. These clamping screws 63 are arranged in two rows.

Each cutting blade 63 is provided with a channel-shaped head 64, which has edges 64a.

As shown in Fig. 9, the front end-portion of each blade bar 62 has a slot 67, into which a respective blade 63 can be inserted. Said slot 67 has an enlarged end, in which the head 64 fits.

As shown in Fig. 9, each slot 67 has an inner wall 67a, which is inclined away from the front end of slot 67 relative to the longitudinal axis of the respective blade bar 62. Each bar 62 has a fixed stop pin 64b, which the inner transverse edge of the respective blade 63 abuts. Each stop pin 64b extends through the walls of the respective slot 67 and said stop pin 64b is fixed to said legs.

Each blade-head 64 is clamped in position at its edges 64a, by a respective clamping bar 65, which is forced into position by a respective clamping screw 66, whose threaded shank engages the internal thread of a respective tapped recess or bore of the respective blade bar 62. Each clamping bar 65 has a flange 65a which abuts the respective blade bar 62.

As one example, and without limiting the invention thereto, the edges 64a are inclined at an angle of 90° to wall 67a of slot 67 in Fig. 9.

As shown in Fig. 6, when the pivoted frame 31 is turned rearwardly away from the front take-up shaft 28, said frame 31 abuts a stop bar 69 which is fixed to frame 1.

A counterweight 70 is connected to a cable 71, which passes around a pulley 72 which is connected turnably to frame 1 of the machine. Cable 71 is fixed to frame 31 by pin 73.

While the machine is running, the turnable guide roll 56 abuts the wound-up rolls 33 of the spirally wound strips S on the mandrel sleeves 68, as indicated in full lines in Fig. 4. The weight of frame 31 is sufficient to keep frame 31 in the position in which idler roll 56 contacts with the peripheries of the rolls 33 of the wound-up strips S on the mandrel sleeves 68, during normal operation. The idler roll 56 is also pressed forwardly against the rears of the peripheries of rolls 33.

While the machine is running, and frame 31 is in the position of Fig. 4, the point 73 is located forwardly of shaft 32. The weight of frame 31 and the parts connected thereto is sufficient to maintain said point 73 forwardly of shaft 32. Hence, while the rolls 33 are formed on the mandrel sleeves 68, said rolls 33 are always subjected to forward pressure at the rears of the peripheries of said rolls 33. As the diameter of rolls 33 increases, the point 73 is moved rearwardly, thus decreasing the forward pressure of idler roll 56 against rolls 33, but said forward pressure is always maintained.

When the rolls 33 have reached the desired diameter and it is necessary to insert a new web of material 34 in the machine, the rotation of shaft 6 is stopped. The frame 31 is then turned by hand to the position of Fig. 6, in which frame 31 abuts stop bar 69, and the point 73 is located rearwardly of shaft 32. The counterweight 70 then holds frame 31 in the position of Fig. 6.

The broken-line positions of rolls 56, 55 and 29 in Fig. 4 illustrate how said rolls are shifted rearwardly as the diameter of rolls 33 increases.

The operation of my machine is as follows:

The frame 31 is moved to the position of Fig. 6, and the cutter blades 63 are moved to their positions of Fig. 6. A new web of material 34 is now threaded through the machine as shown in Fig. 7, until the front end of the web 34 extends over the front idler roll 56.

The cutter blades 63 are moved to cutting position to pierce the web of material 34 and said web is pulled by hand, until strips S of sufficient length have been produced. The front unslitted portion of the web is then cut off. The front ends of strips S are then fixed to their mandrels 68.

If desired, when the machine is started, and the frame 31 and blades 63 are in their positions of Fig. 4, the front edge of the unslitted web can be pulled over roll 56 and the blades 63 can then be moved to their slitting positions, to form slits behind the front unslitted part of the web. The strips are then fixed to the respective mandrel sleeves and the front unslitted part of the web can then be cut off.

Optionally said strips S are of sufficient length to be wound spirally one or more times around their respective mandrel sleeves 68.

The shaft 6 is now driven.

Unless the brake-cable 38 is tightened, the web 34 is under little or no tension between magazine roll 134 and the rear idler roll 42 and it may be under little or no tension between idler roller 42 and the driven roll 51.

As shown in Fig. 1, the sprocket 27 is of smaller pitch diameter than sprocket 25, so that the take-up shaft 28 is rotated at greater angular velocity than shaft 24.

The wind-up velocity of take-up shaft 28 is always greater than the velocity of web 34 between the driven gripping and feeding rolls 52 and 51. I designate the roll 52 as a driven roll, because it is driven frictionally by roll 51.

The strips S are therefore always subjected to tension between the take-up shaft 28 and the rolls 52 and 51. This tension will increase as the diameter of the wound strips S on the mandrel sleeves 68 increases. Hence, and as shown in Fig. 3, I provide the slip friction-clutch C between gear 23 and sprocket 25. This clutch C slips when the tension on web 34 between rolls 52—51 and take-up shaft 28 exceeds a selected value.

As the diameter of the wound-up strips S increases, the frame 31 is tilted away from take-up shaft 28, so that blades 63 always operate at substantially the same longitudinal distance from the peripheries of the wound-up strips S on the sleeve mandrels 68. This is an important feature of my invention. Another important feature of my invention is to keep the front idler roll 56 continuously pressed under any desired longitudinal forward pressure against the rears of the peripheries of the spiral rolls 33 of strips S. This pressure can be regulated by selecting the weight of frame 31 and the weight of its counterweight 70.

Also, the blades 63 slit the planar web 34 while it is moving upwardly in a straight line under suitable tension, against the points of the downwardly inclined edges of the blades 63. These blades 63 cut the web at points about 1.5-2 inches behind the front idler roll 56, or even closer thereto, depending upon the number and width of the strips S to be cut. This distance between the said slit points and the front idler roll 56 should be decreased with the width of the cut strips S. A distance as great as 1.5-2 inches is sufficient only if a relatively few, wide strips are to be cut, as for example, if the web 34 is to be cut in half, or in thirds. If a relatively large number of strips S are to be cut, as shown in the drawings, so that said strips are relatively narrow, said strips S tend to move laterally. In such an instance the cutting edges of blades 63 must be located as close as possible to the front idler roll 56 to prevent such lateral movement of strips S after cutting. In the drawings, for convenience of illustration, the blades 63 are shown spaced an appreciable distance from the front idler roll 56. It is to be understood, however, that when as great a number of narrow strips S are to be cut, as shown in the drawings, the cutting edges of blades 63 are to be located closer to the front idler roll 56.

As above noted, the guide rolls 56, 55 and 29 are mounted on the same frame 31, so that said guide rolls 56, 55 and 29 are shifted in unison, and the blades 63 are also shifted in unison with said guide rolls during the operation of the machine. At the beginning of the operation, the strips must be led to the mandrel sleeves 68. If roll 56 were omitted, it would then be necessary to have long runs or parts of the strips between the blades 63 and the mandrel sleeves 68. Such long runs would cause thin strips to shift laterally.

By locating the blades 63 close to guide roll 56, such undesirable lateral shifting is prevented.

For convenience, the material which is located between blades 63 and the forwardly located guide roll 56 is designated as being in the slitting zone. The material which is spirally wound in roll form is designated as being in the winding zone. The material which abuts the roll 56 is designated as being in the intermediate zone. The material is bent transversely in said intermediate zone and it is pressed against the rolls of material in the winding zone, at the junction between said winding zone and said intermediate zone.

In the modification of Figs. 11-13, I provide an additional brake for the web 34, at the rear idler roll 29 of frame 31.

This additional brake is a flexible brake-band 79, which has the same width as the idler roll 29, so that brake-band 79 contacts with web 34 along its entire width.

One end of brake band 79 is connected by fastening means 74a to rod 74, which is fixed to rods 78, which are fixed to frame 31. The other end of the flexible brake-band 79 is fixed by fastening means 75a to a cross-bar 75, which is pivotally connected to rods 78. The cross-bar 75 is provided at its ends with handles 76. When the handles 76 are turned by hand from the non-braking position of Fig. 11 to the braking position of Fig. 12, the brake-band 79 is tightened to contact with the material 34.

I have disclosed preferred embodiments of my invention, but numerous changes and omissions and modifications can be made without departing from its scope, and I include the subcombinations disclosed herein within the scope of my invention.

For example, I do not limit the invention to the use of separate mandrel sleeves 68 as mandrel means, because said mandrel means may be the take-up shaft 28 or a single mandrel sleeve located on shaft 28.

Also, while I prefer to use guide rolls such as the rolls 56, 55, 29 and 30, I can substitute non-rotating guide-members for said guide-rolls.

I claim:

1. In a machine for cutting a web of material which has a longitudinal axis into a series of longitudinal strips along longitudinal slit lines, the combination of a supporting frame, a take-up shaft mounted on the frame to which the web is adapted to be fed forwardly and wound in spiral rolls, a frame mounted on the supporting frame for movement toward and away from the take-up shaft, longitudinally spaced front and rear guide members for said web connected to said movable frame and movable in unison therewith toward and away from said take-up shaft, the front guide member being positioned to abut the wound rolls on said take-up shaft, said guide members being closely spaced and being arranged for stretching of the web in bridging relation therebetween, a plurality of slitting knives arranged substantially in side-by-side relation between the guide members in positions to slit the web into a multiplicity of strips while the web is stretched in bridging relation between the guide members, a bar for supporting the knives extending transversely of the movable frame and mounted thereon for movement relative thereto, said knives being thus movable toward and away from said take-up shaft with said movable frame and being normally held in a cutting position in which the knives are closely spaced from the front guide means, and supports carried by the bar and extending laterally therefrom supporting the knives for bodily upward movement of the knives out of cutting positions upon movement of the bar, said movable frame including upstanding frame bars having lateral extension plates on the upper ends thereof, said guide members extending between the extension plates and carried thereby, and pivots for the lower end portions of the frame bars, said knives having cutting portions which extend downwardly through said web in the direction of said take-up shaft when said knives are in cutting position, said knives in said cutting position having cutting edges which are inclined upwardly relative to said web, said edges being directed reversely to the direction of feed of the web.

2. In a machine for cutting web of material which has a longitudinal axis into a series of longitudinal strips along longitudinal slit lines, the combination of a supporting frame, a take-up shaft mounted on the frame to which the web is adapted to be fed forwardly, said take-up shaft having mandrel means on which said strips are wound spirally in respective rolls, a frame mounted on the supporting frame for movement toward and away from the take-up shaft, longitudinally spaced front and rear guide members for said web mounted on said movable frame and movable in unison therewith toward and away from said take-up shaft, said guide members being closely spaced and being arranged for stretching of the web in bridging relation therebetween, means biasing said movable frame towards said take-up shaft to maintain said front guide-member pressed against said mandrel means and also against the peripheries of said rolls when said rolls are formed, a plurality of slitting knives arranged substantially in side-by-side relation between the guide members in positions to slit the web into a multiplicity of strips at said slit lines while the web is stretched in bridging relation between the guide members, a bar for supporting the knives extending transversely of the movable frame and journalled thereon for turning movement relative thereto, said knives being movable toward and away from said take-up shaft with said movable frame and said guide members, said knives being normally held in a cutting position in which the knives are located sufficiently close to the front guide members to maintain said strips substantially parallel and separate from each other, and supports carried by the bar and extending laterally therefrom supporting the knives for bodily swinging movement of the knives out of cutting positions upon rotation of the bar on its journals, said movable frame including upstanding frame bars having lateral extension plates on the upper ends thereof, said guide members extending between the extension plates and carried thereby, and pivots for the lower end portions of the frame bars, said knives having cutting portions which extend downwardly through said web in the direction of said take-up shaft when said knives are in cutting position, said knives in said cutting position having cutting edges which are inclined upwardly relative to said web, said edges being directed reversely to the direction of feed of the web.

DAVID N. JUDELSON.

REFERENCES CITED

The following references are of record in the file of this patent:

UNITED STATES PATENTS

| Number | Name | Date |
|---|---|---|
| Re. 12,445 | Engberg | Feb. 6, 1909 |
| Re. 13,528 | Steber | Feb. 11, 1913 |
| 207,411 | Frank | Aug. 27, 1878 |
| 375,728 | Brissaut | Jan. 3, 1888 |
| 441,476 | Ford | Nov. 25, 1890 |
| 797,491 | Cameron | Aug. 22, 1905 |
| 1,174,738 | Langston | Mar. 7, 1916 |
| 1,671,724 | Johancen et al. | May 29, 1928 |
| 2,205,563 | McJohnstone | June 25, 1940 |
| 2,214,593 | Mustin et al. | Sept. 10, 1940 |
| 2,310,153 | Rosenfarb | Feb. 2, 1943 |